Nov. 19, 1968     P. FERKO     3,411,218
SYSTEM FOR INDIVIDUAL STAR OCCULTING IN A PROJECTED STARFIELD

Filed Dec. 29, 1965     2 Sheets-Sheet 1

INVENTOR
Peter Ferko

BY William Grobman

ATTORNEY

INVENTOR.
PETER FERKO

United States Patent Office 3,411,218
Patented Nov. 19, 1968

3,411,218
SYSTEM FOR INDIVIDUAL STAR OCCULTING
IN A PROJECTED STARFIELD
Peter Ferko, Rockville, Md., assignor to General Precision, Inc., Binghamton, N.Y., a corporation of Delaware
Filed Dec. 29, 1965, Ser. No. 517,271
4 Claims. (Cl. 35—45)

ABSTRACT OF THE DISCLOSURE

This disclosure describes an optical system in which a plurality of images are superimposed, one upon the other, on a common image plane. Where one image is that of an opaque object which is interposed between the background image and the viewer, occulting optical relays controlled by the image of the opaque object serve to obliterate appropriate portions of the background image to prevent the background image from bleeding through the foreground image. Where a planetarium, for example, projects the background image, the foreground image is projected onto the back side of the planetarium. Each projector of an optical image on the planetarium is equipped with an occulting shutter. Each shutter is controlled by a photocell which is 180° displaced from the shutter. Thus, the foreground image projected on the back of the planetarium illuminates photocells mounted thereon. These photocells control the appropriate shutters which close and block off a portion of the background image.

---

This invention relates to visual simulation systems in which one image is superimposed upon another, and more particularly to a system which includes means for preventing the bleeding of one image through another.

In visual simulation systems which are used for the training of operators for many types of devices such as aircraft and the like, the prime objective is a properly operating or responsive image display which is realistic and which evokes the proper responses in a well-trained operator. Often, more than one device is being visually simulated, and each device must respond to the sequence of events in the mission in its own manner. To provide for this type of operation, an image of each device is separately generated and controlled. The individual images are then combined in a single simulation. When one of these images comprises an over-all background such as the heavens, portions of this background will often appear to bleed through (be visible through) the image which is superimposed thereon. A realistic image of a solid opaque object seen against the heavens can hardly be created when some of the stars appear to be visible through that object. Obviously, to create plausible composite images which simulate a plurality of separate objects together as they appear through the separate phases of an operating mission, some means must be provided for causing those objects which are supposed to be opaque to appear to be opaque.

It is, therefore, an object of this invention to provide a new and improved visual simulator.

It is another object of this invention to provide a new and improved visual simulator for producing composite images of devices.

It is a further object of this invention to provide a new and improved system for creating superimposed composite images of a plurality of objects in such a manner that the bright spots of one image do not bleed through an image superimposed thereon.

Figure 1:
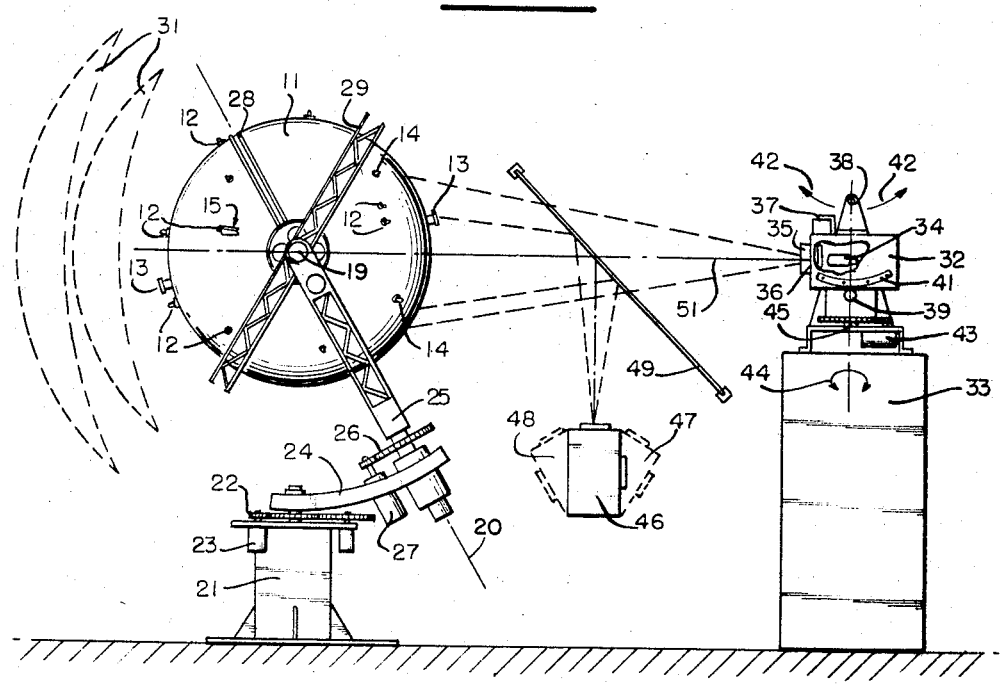
Figure 2:
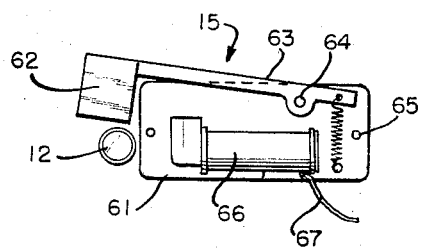
Figures 3, 4:
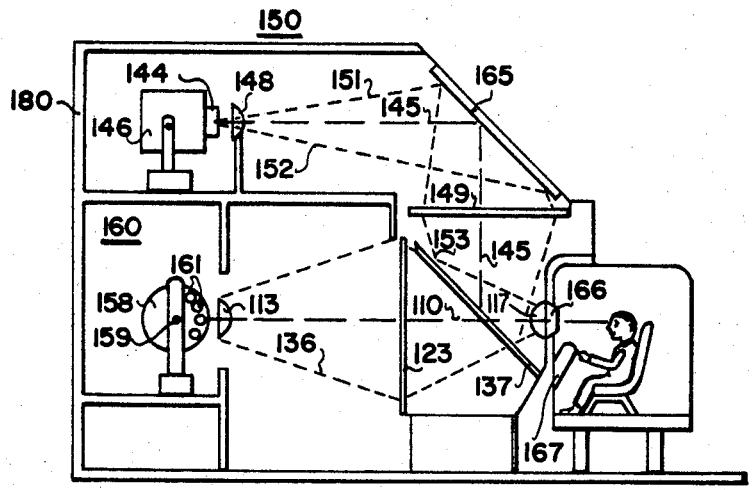

Other objects and advantages of this invention will become apparent as the following description proceeds, which description should be considered together with the accompanying drawings in which:

FIG. 1 is a schematic elevational showing of a starfield generator which incorporates this invention, FIG. 2 is a plan view of a shutter used in the system of FIG. 1, FIG. 3 is an elevational schematic view of a system for projecting a plurality of images on a common image plane, and FIG. 4 is a pictorial view of a pair of superimposed images as seen by the observer of FIG. 3.

Referring now to the figures in detail, reference character 11 designates a hollow sphere which comprises a starfield projector and which is otherwise known as a "planetarium." The sphere contains a bright source of light in its interior, preferably centered, which provides light for projection through small lens systems 12 mounted in the surface of the sphere 11. The lens systems 12 are generally arranged so that the images projected thereby form a true picture of a portion of the heavens. The lens systems 12 are made in several sizes to create images of stars of different magnitudes, and, in addition, the sphere 11 may contain lens systems 13 for creating images of larger celestial bodies such as the planets, the sun, and the moon. The sphere 11 is mounted on a complex supporting system with appropriate means provided for rotating the sphere 11 through all possible and desirable degrees of rotation. The support structure comprises a firmly anchored base 21 which carries a gear 22 driven by a motor 23 to cause an arc support 24 to rotate. The arc support 24 carries, in turn, a main yoke 25 rotatably mounted on an axis 20 by means of a gear 26 which is driven by a motor 27. The sphere 11 carries drive rings 28, which are mounted on a central hub 19, and is protected by girders 29. The images generated and projected by the planetarium 11 are focused by a lens system 31 upon a screen, not shown, where they are viewed by an observer, together with other images generated by other devices.

The device so far described comprises a well-known planetarium which is precision built and used to create images of the heavens, heavenly bodies and their relative motions. In the system used as an example to explain this invention, the planetarium 11 would be used as a starfield generator to generate images of the heavens for viewing by individuals who are being trained to operate vehicles in which the heavenly bodies are continually observed. One example of this type of training program is the training of astronauts, or "spacemen," in the use of the complex equipment designed for their missions. It is readily realized that the training of those who take part in ventures into extra-terrestrial space cannot readily be done in actual space travel, but must be accomplished by simulating the actions of the equipment being used. In these devices the simulation of the heavens, visually, and the visual simulation of other objects relative to the heavens is important. For proper training, the simulation must be plausible to the point where a change in the object being simulated evokes proper response in the person being trained. Plausibility of a visual system is somewhat strained if the student can see the stars clearly visible through what is supposed to be a spaceship or planet between him and the heavens itself. To illustrate apparatus for achieving the superimposed images, reference will be made to FIGS. 3 and 4.

To illustrate one system in which images may be superimposed, FIG. 4 has been borrowed from the copending application Ser. No. 511,149, filed by Neuberger and Myles on Dec. 12, 1965, and entitled Virtual Image Window Display. An observer is seated so that he can look through a window 166, usually circular, and a lens 117 onto a semitransparent screen 123. A first image projector, in this case a planetarium 158, is pivoted on a shaft 159. The planetarium 158 carries a plurality of lens systems 161, each of which generates a separate image as explained above. The images to be viewed are projected through a lens 113 onto the back of the screen 123. At the same time, a second image generator 146, which may be of the television projector type, projects an image through a lens 148 and, by means of a mirror 165, around a corner onto another semitransparent screen 149. A half-silvered mirror 137 passes the image from the screen 123 and reflects the image from screen 137 onto the focal plane of the lens 117 to provide the observer with a single view formed of two superimposed images provided by two separate image generators 158 and 146.

The view which the observer sees may be similar to that shown in FIG. 4, in which the circle 166 represents the round window through which the observer looks. Stars 190 are shown in proliferation with some of the larger stars shown at 191 in what may be considered a fanciful showing of a portion of the constellation Orion. An Apollo space capsule 192 is shown on its way back from the moon. To see stars through the image of the Apollo capsule would completely destroy the illusion. Therefore, to produce a realistic display, additional equipment is added to the planetarium described above.

To achieve realistic images, means for occulting individual star generators is provided on the planetarium 11. The occulting means 15 is shown on the planetarium 11 adjacent one of the lens systems 12 and in greater detail in FIG. 2. Referring to FIG. 2, a base 61 supports a flag or shutter 62 which is an extension of a long arm 63 mounted on a pivot 64 at a point intermediate its ends. The end of the arm 64 which is remote from the shutter 62 is attached to one end of an expansion spring 65, the other end of which is connected to the base 61. An electromagnetic coil 66 is also mounted on the base 61 and has terminals 67 for connection to a source of electrical energy. When electrical energy is supplied to the terminal 67, the coil 66 is energized and the magnetic flux generated by the coil 66 causes the arm 63 to rotate on the pivot 64 against the action of the spring 65 to move the shutter 62 in front of the lens system 12, preventing radiation from that particular lens 12.

To select which of the lens systems 12 will be blanked out at any time, photocells 14 are mounted on the sphere 11 to control individual shutters 15. The individual photocells are displaced 180° from the shutters they control. The images of the objects which are supposed to be superimposed upon the starfield generated by the planetarium 11 are generated in a pair of image generators 32 and 46. The generator 32 is mounted upon a base 33 and contains a projection lamp 34. Between the projection lamp 34 and a projection lens system 35 is a film or other type of image generating device 36 the position of which is controlled by a motor 37. The housing 32 is mounted for pendulum motion as shown by the arrows 42 on a pivot 38. This motion is controlled by means of a pinion gear 39 driving a curved rack or sector gear 41. A motor 43 drives a gear 45 for rotating the projector 32 about a vertical axis as shown by the arrows 44. The image generated by the generator 32 is projected along an optical axis 51 through a beam splitter or semitransparent mirror 49 onto the back surface of the planetarium 11. When more than one object is to be simulated passing between the observer and the field generated by the planetarium 11, the second image generator 46 may be used. This may readily comprise a television projection system which is movably mounted to assume any of several positions such as those shown by the dashed lines at 47 and 48. The image generated by the generator 46 is projected onto the beam splitter 49 and is reflected thereby onto the back surface of the planetarium 11.

In operation, the light source contained within the planetarium 11, which light source is not shown in these figures, is illuminated and, the planetarium 11 is rotated to its desired position. The starfield images together with the images of the planets, the moon, if desired, and similar celestial objects are projected through the lens system 31 onto an appropriate screen or window for observation by the observer, who may be a student. In the normal system, a moving image of some sort is simulated optically, and this comprises the environment for a simulated movement of the enclosure which contains the student through a prescribed volume of space. If this space is extra-terrestrial space, then the planetarium 11 generates the pattern of stars which are found in that portion of the heavens through which the simulated craft is supposed to be moving. Should, for example, the mission involve the rendezvous of the craft containing the observer with another object, the visual sighting of the other object will take place against the background of the stars and other heavenly bodies. To create realistic simulations, the observer should not be able to see the stars through the image of the other object. To accomplish this, those stars before which the object with which the rendezvous is to take place must be blanked out or they would bleed through the image of that object and ruin the illusion. The image of the object is also transmitted to one of the image generators 32 or 46 (under the conditions of this explanation, it would most likely be generator 46) as well as to the screen where it is observed by the student, and that image is projected onto the back surface of the planetarium 11. Those photocells 14 which are illuminated by the image of the object operate as variable resistance values and "open" to cause energization of the shutters 15 on the front face of the planetarium 11 with which they are associated. The energization of the shutters 15 results in the energization of the coils 66 to create the magnetic field which causes the arm 63 to pivot about its mounting 64 against the action of the spring 65 to move the flag 62 across the face of the lens system 12. Thus, no light is projected from the shuttered lens system 12 to the wide angle lens 31, and there is no star image in that particular position to bleed through the image of the object.

Of course, in order for the system to operate properly, the photocells 14 on one side of the planetarium 11 must operate shutters which are virtually diametrically opposite on the other side of the planetarium 11. The pattern of the photocells 14 is the reverse of the pattern of the lenses 12 so that if the planetarium 11 were transparent, an observer looking through the planetarium from the position of the mirror 49 would see the outline of the image projected by the projector 32 exactly superimposed upon the image which appears to be between the observer and the field generated by the planetarium 11. As the object which appears to be between the observer and the heavens, as generated by the planetarium 11, changes in position or relative size with respect to the rest of the visual simulation, the image projected by the projector 32 or the generator 46 onto the back surface of the planetarium 11 must also change in exactly the same manner. The relative position of the object being discussed and the individual stars generated by the planetarium 11 are automatically adjusted by the positioning of the planetarium 11. Thus, when the mission being simulated calls for the movement through space not only of the observer but of another object, then the planetarium 11 can be slowly rotated to simulate this movement by changing the positions of the background starfield. As the position of the planetarium 11 changes so that the relative positions of the lenses 12 and the object seen against the stars generated thereby changes, so does the relative position of the photocells 14 with respect to the image being generated by either of the image generators 46 or 32. Thus, the movement of the object against the background stars is accomplished by the movement of the planetarium 11. In this case, the image generated by the generators 46 and 32 need not be modified. However, as the image of an object seen by an observer against a background of stars appears to approach or recede from the observer, it grows larger or smaller. To compensate for variations in size of the image, the image generated by the generators 32 and 46 must be modified in size similarly so that the areas on both sides of the planetarium 11 covered by that image are the same.

The particular shutter shown in FIG. 2, of course, is not the only form that a shutter for this purpose can take. For example, the shutter can be a flat piece of opaque material pivotally mounted perpendicular to the surface of the planetarium 11 adjacent a lens 12 so that when an adjacent solenoid is energized, it rotates into a position parallel to the face of the planetarium 11 to cover the lens 12. In addition, instead of using a spring 65 to maintain the shutter in the open position, it may be maintained in that position by gravity, by a readily operable latch, by permanent magnets, or by similar devices. In a like manner, the solenoid may be arranged to open the shutter when it is energized or to close the shutter when it is energized. The particular embodiments described and shown in the specification are by no means to be considered the only possible structures which can accomplish the broader objectives of this invention. It is realized that the above description may indicate to others in the art additional ways in which the principles of this invention may be utilized without departing from its spirit. It is therefore intended that this invention be limited only by the scope of the appended claims.

What is claimed is:

1. A system comprising means for generating a visual background, means in said system for generating images of objects which are to appear to move against the background, means for combining the images of said background and said objects, means to occult those portions of said background which are to appear to be obliterated by said images of said objects, said means for generating the visual background comprising means for generating a plurality of separate images, means for projecting said separate images so that they blend into a single composite background, said occulting means being responsive to individual signals for blocking the projection of selected ones of said separate images within the general outline of the object superimposed thereon, means for generating duplicate images of said objects, means for projecting said duplicate images upon a control network responsive to radiant energy to generate said control signals, and means for applying said individual control signals to said occulting means to block the projection of individual separate images in the same patterns formed by said duplicate images.

2. The system defined in claim 1 wherein said network comprises a plurality of photosensitive cells, said system further including a plurality of separate occulting means, one of said separate occulting means being situated to block the projection of each of said separate images, and means for connecting one of said photosensitive cells to each of said separate occulting means to control the operation of said individual occulting means when the cell associated therewith is energized.

3. The system defined in claim 2 wherein each of said separate occulting means comprises a shutter, means for maintaining each of said shutters in an unblocking position, and means responsive to the signals from the associated photosensitive cell for moving said shutter into a blocking position to block the projection of the separate image associated therewith.

4. A system for generating a plurality of separate images and superimposing one of said images upon another, said system comprising a first generator for producing a first image, a second generator for producing a second image, means for projecting said first and second images upon a common image plane so that at least a portion of said one image is to appear to be superimposed upon at least a portion of said second image, means for preventing said portion of said other of said images from bleeding through said one image including means for blocking the projection of selected portions of said second images, said blocking means comprising a plurality of shutters individually operated in response to individual signals so that each operated shutter is interposed between said second generator and said image plane, means for selectively operating individual shutters comprising a bank of separate photosensitive cells, one separate photosensitive cell for each shutter, means for connecting each of said cells with its associated shutter, and means for projecting a duplicate image of said first image controlled to fall upon said bank in the same relationship as said first image falls upon said second image whereby the photosensitive cells upon which a portion of said second images falls generate signals to cause said associated shutters to operate.

References Cited

UNITED STATES PATENTS 1,806,452    5/1931    Fulgora _____ 352—133 X
2,178,352   10/1939    Unglaube et al.

JEROME SCHNALL, *Primary Examiner.*